United States Patent
Usami et al.

(10) Patent No.: US 7,152,648 B2
(45) Date of Patent: Dec. 26, 2006

(54) RE-TREADING METHOD AND APPARATUS

(75) Inventors: Shigeoki Usami, Kodaira (JP); Kiyoharu Kurihara, Kodaira (JP); Shigeo Makino, Kodaira (JP); Tsutomu Tanaka, Kodaira (JP); Keizou Okita, Nashville, TN (US)

(73) Assignee: Bridgestone Corporation, Tokyo (JP)

( * ) Notice: Subject to any disclaimer, the term of this patent is extended or adjusted under 35 U.S.C. 154(b) by 268 days.

(21) Appl. No.: 10/944,847

(22) Filed: Sep. 21, 2004

(65) Prior Publication Data

US 2005/0034804 A1 Feb. 17, 2005

Related U.S. Application Data

(62) Division of application No. 09/950,696, filed on Sep. 13, 2001, now Pat. No. 6,841,017.

(30) Foreign Application Priority Data

Sep. 14, 2000 (JP) .............. 2000-280888
Sep. 14, 2000 (JP) .............. 2000-280890

(51) Int. Cl.
B29D 30/56 (2006.01)
B29D 30/54 (2006.01)

(52) U.S. Cl. ............... 156/353; 156/96; 156/360; 156/361; 156/406.6; 156/909

(58) Field of Classification Search ............ 156/406.4, 156/406.6, 909, 96, 353, 360, 361
See application file for complete search history.

(56) References Cited

U.S. PATENT DOCUMENTS

| 3,502,131 A | 3/1970 | Rawls | |
| 5,175,930 A | 1/1993 | Okuyama et al. | |
| 5,427,636 A * | 6/1995 | Chabin et al. | 156/909 X |
| 5,720,837 A | 2/1998 | Regterschot et al. | |
| 5,942,059 A | 8/1999 | Wulker et al. | |
| 6,547,906 B1 | 4/2003 | Kolker et al. | |
| 6,758,931 B1 * | 7/2004 | Daugherty et al. | 156/406.6 X |
| 6,899,778 B1 * | 5/2005 | Gridley et al. | 156/909 X |
| 2002/0185211 A1 | 12/2002 | Saamer | |
| 2004/0256057 A1 * | 12/2004 | Gridley et al. | 156/406.6 X |

FOREIGN PATENT DOCUMENTS

| EP | 0 326 280 A2 | 8/1989 |
| EP | 0 447 273 A2 | 9/1991 |
| EP | 0 490 599 A2 | 6/1992 |
| EP | 0 561 609 A1 | 9/1993 |
| EP | 0 704 296 A1 * | 4/1996 |
| EP | 1 120 234 A2 * | 8/2001 |
| GB | 1151099 A | 5/1969 |
| JP | 06262703 A * | 9/1994 |
| JP | 06262704 A * | 9/1994 |

* cited by examiner

Primary Examiner—Adrienne C. Johnstone
(74) Attorney, Agent, or Firm—Sughrue Mion, PLLC

(57) ABSTRACT

A re-treading method and an apparatus therefor can detect a deviation amount of the position distant by a required tread length from the leading edge of the tread material from a predetermined pattern position near that position planned to be cut, cut the tread material at the at the predetermined position, wind the cut-out tread material on the outer circumference of the base tire while adjusting the length of the tread material by applying thereto a substantially uniform tensile or compressive force, and unite the leading and trailing edges of the tread material wound on the base tire.

3 Claims, 9 Drawing Sheets

RE-TREADING METHOD AND APPARATUS

This is a divisional of application Ser. No. 09/950,696 filed Sep. 13, 2001, the entire disclosure of which is incorporated herein by reference.

BACKGROUND OF THE INVENTION

1. Field of the Invention

This invention relates to retreading method and machinery for fabricating a recapped tire by cutting a vulcanized tread material, vulcanized in form of a continuous belt, such that leading and trailing edges to be bonded meet in tread pattern, and then winding the tread strip on a base tire.

2. Description of the Related Art

In a pre-curing method (cold recapping method), which winds on a base tire a vulcanized tread (pre-cured tread) strip having a pattern formed on its surface, then bonds its leading and trailing edges, and vulcanizes the tire in a vulcanization chamber, the vulcanized tread strip is previously vulcanized and molded in a length corresponding to the length of one to three tires, and this tread material is cut and wound on a prepared base tire, followed by bonding its leading and trailing edges.

Typically used for this bonding is a technique that wraps the circumferential surface of a base tire with a tread rubber material approximately up to 340 degrees, loosely putting the remainder of the tread rubber material on the base tire to find a position meeting the leading edge, where the remainder part of the tread rubber material should be cut, then marks that position and cuts it there with a cutter, and bonds the resultant trailing edge of the tread rubber material in abutment with the leading edge.

This method, however, could not provide a high productivity because it relies on operator's visual detection of the position of the tread rubber to be cut before bonding the leading and trailing edges and on operator's manual task of cutting it with a cutter.

Furthermore, although this method cuts out a strip from a tread material to meet with the length of the outer circumference of a base tire, base tires have various circumferential lengths depending on differences in growth amount of the outer diameter, differences in outer diameter among different patterns of tire manufacturers, and so on.

Thus the cut position is not constant relative to the surface pattern, and divided pattern blocks come out with various sizes.

Figure 10:
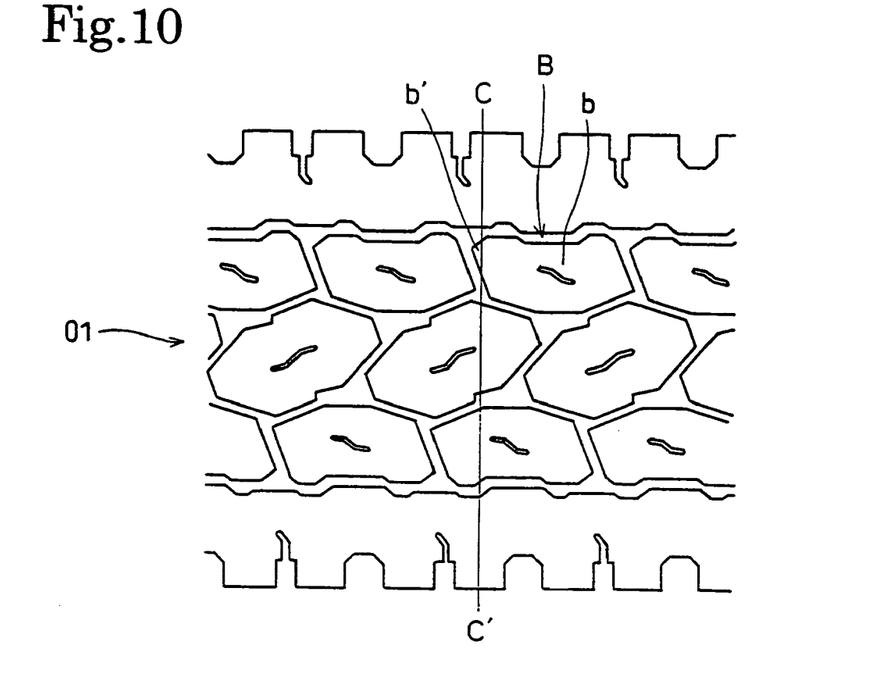
FIG. 10 is a diagram that shows a tread pattern of a pre-cure tread and a conventional cut position thereof.

For example, assume that a tread material 01 having a tread pattern as shown in FIG. 10 is to be cut at the cut position C–C'.

When a particular pattern block B is remarked, one divisional pattern block b at one side of the cut position C–C' has a larger volume whereas the other divisional pattern block b' has an extremely small volume.

Figure 11:
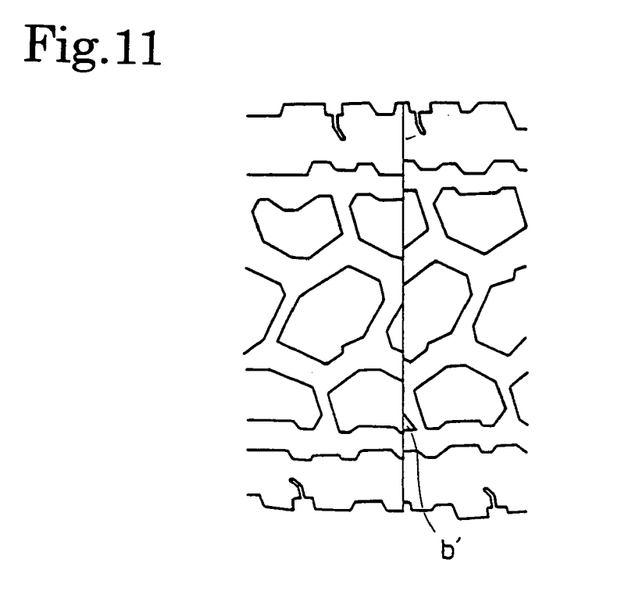
FIG. 11 is a diagram that shows a pattern-mismatched joint condition of the leading and trailing edges of a pre-cure tread.

If a divisional pattern block with such an extremely small volume remains on a recap after being molded, the recap is liable to suffer local wearing, during use, at the portion of the divisional pattern block b' bonded with a small length of bonding as shown in FIG. 11 showing an example of joint of the leading and trailing edge.

In some cases, a groove and a block portion may come to butt at the joint of the leading and trailing edges of the tread rubber material, which will make a defective joint and will lead to local separation of the joint.

Furthermore, unless divisional pattern blocks of the leading edge and the trailing edge do not meet well, there occur size differences in blocks at the joint of the leading and trailing edges, and this may cause local wearing, or, if a pattern groove or a thin filleted block end abuts with the cut surface of a pattern block, separation of the joint will occur due to the defective bonding, and the outer aspect of the pattern will be damaged.

To cope with these problems, there is a method of ensuring pattern matching at the joint between the leading and trailing edges by preparing a tread rubber material having a leading edge and a trailing edge cut along a line having the same pattern as the cut line of the leading edge and distant from the leading edge by a length nearest to the required length, and putting the tread rubber material on the base tire while expanding or contracting it to adjust its length with the circumferential length of the base tire.

This conventional method, however, burdens operators with various tasks upon cutting the tread rubber material at a desired pattern position. That is, an operator must stop the machine to confirm the cut position by lightly pressing a cutter on the tread rubber material, or estimate the cut position from the anvil position of the cutter; if the cut position is not a proper position, the operator must move the tread rubber material to a proper position by manually operating a conveyor or other transport machine; and he or she actually cuts it after a gain confirming the cut position.

As reviewed above, since the but position is visually confirmed by an operator and manually adjusted in position, high accuracy of the cutting position cannot be expected even at the cost of the required time and labor.

While winding the tread rubber material on the base tire, when the operator winds the last part of the tread rubber material after finishing the winding of a larger half of the tread rubber, the operator must expand or contract the last part of the tread rubber material to adjust the length such that the trailing edge comes into exact abutment with the leading edge.

Therefore, the cutting task is inefficient, and the finishing quality of the winding job is largely affected by the skill of the operator.

Further, since the tension or compression is locally concentrated to the trailing end portion of the tread rubber material, the tread rubber material cannot be wound on the base tire in a uniform condition.

SUMMARY OF THE INVENTION

It is therefore an object of the invention to overcome those problems and provide a re-treading method and an apparatus therefor, which employ pattern matching free from local wearing or separation at the joint, and uses an imaging means to cut a tread material automatically, efficiently and precisely so as to ensure pattern matching.

A further object of the invention is to provide a re-treading method and an apparatus therefor, which employ pattern matching free from local wearing or separation at the joint, and expand or contract the tread material uniformly, automatically and efficiently to adjust its length so as to ensure pattern matching when winding the tread material, thereby to realize an adequate bonding condition of the leading and trailing edges.

According to one embodiment of the invention, there is provided a re-treading method comprising transporting a predetermined amount of a vulcanized tread material vulcanized and molded in the form of a continuous belt from a cut position; photographing an image of a tread pattern in a zone of said tread material including said cut position; comparing said photographed tread pattern image with a tread pattern image stored beforehand to detect a deviation amount between them; moving said tread material or said cut position relative to each other by said deviation amount; cutting said tread material at the cut position after the relative movement; and winding said tread material cut out and joining leading and trailing edges thereof.

The pattern block to be cut is roughly determined by transporting the vulcanized tread material from the cut position and thereby roughly determining the trailing end cut position of the tread material which will make a length near the length required for wrapping the base tire.

Then by photographing the tread pattern at the cut position, comparing it with the tread pattern image stored beforehand, and cutting the tread material at that cutting position if both images coincide, the tread material can be cut at the predetermined position on the pattern. If a deviation is found by comparison with the stored tread pattern image, by detecting the deviation amount and relatively moving the tread material or the cut position by the deviation amount, the tread material can be cut at the predetermined position on the pattern.

Therefore, it is ensured that the tread material is always cut at the predetermined position on the pattern near the position at the required tread length, and the leading and trailing edges of the tread material wound on the base tire match well in pattern at the joint.

In this manner, cutting of the tread material for pattern matching can be executed automatically, efficiently and precisely.

Since the edges match in pattern, the joint is unlikely to suffer local wearing or separation, and its outer aspect is good as well.

According to another embodiment of the invention, there is further provided a re-treading method comprising transporting a predetermined amount of a vulcanized tread material vulcanized and molded in the form of a continuous belt from a cut position; photographing an image of a tread pattern in a zone of said tread material including said cut position; judging whether said deviation amount is in an allowable range; moving said tread member or said cut position relatively to each other by said deviation amount upon judging that said deviation amount is in the allowable range, or not moving same judging that said deviation is in the allowable range; cutting said tread material at said cut position relatively moved or not moved; and winding said tread material cut out and joining leading and trailing edges thereof.

The pattern block to be cut is roughly determined by transporting the vulcanized tread material from the cut position and thereby roughly determining the trailing end cut position of the tread material which will make a length near the length required for wrapping the base tire.

Then by photographing the tread pattern at the cut position, comparing it with the tread pattern image stored beforehand, and cutting the tread material at that cutting position if a deviation amount is within an allowable range, the tread material can be cut at the predetermined position on the pattern. If the deviation is found to be out of the allowable range, by relatively moving the tread material or the cut position by the deviation amount, the tread material can be cut at the predetermined position on the pattern.

Therefore, it is ensured that the tread material is always cut at the predetermined position on the pattern near the position at the required tread length, and the leading and trailing edges of the tread material wound on the base tire match well in pattern at the joint.

In this manner, cutting of the tread material for pattern matching can be executed automatically, efficiently and precisely. Since the edges match in pattern, the joint is unlikely to suffer local wearing or separation, and its outer aspect is good as well.

A further embodiment of the invention is the re-treading method characterized in that said tread pattern image stored beforehand includes a planned cut line, and said planned cut line is determined to ensure that all of divisional pattern blocks divided by cutting respective blocks of said tread pattern image have a volume not smaller than a predetermined value.

Since the planned cut line is set at a position ensuring that all divisional pattern blocks have a volume not smaller than a predetermined value, no divisional pattern block having an unacceptably small volume is produced when the corresponding actual tread material is cut at the cut position, and various disadvantages including local wearing or separation at the joint of the leading and trailing edges can be prevented.

A further embodiment of the invention is the re-treading method characterized in that said cut position is moved relative to said tread material by said deviation amount.

This is configured to move the cut position by the deviation amount relative to the tread material held stationary, and to cut the trailing edge of the tread material at the moved cut position.

A still further embodiment of the invention is based on the re-treading method characterized in that said tread material is moved relative to said cut position by said deviation amount.

This is configured to move the tread material by the deviation amount and cut the trailing edge of the tread material at a fixed cut position, and can therefore move the tread material just by the deviation amount by using a tread material feeding machine.

According to an additional embodiment of the invention, there is provided a re-treading method comprising detecting a deviation amount between a position at a required tread length from a leading edge of a vulcanized tread material vulcanized and molded in the form of a continuous belt and a predetermined pattern position near said position planned to be cut; cutting said tread material at said predetermined pattern position; winding said tread material cut out on the outer circumference of a base tire while adjusting the length thereof to remove said deviation amount by applying thereto a substantially uniform tensile or compressive force; and joining leading and trailing edges of said tread material wound on said base tire.

Since the tread material is cut always at the predetermined pattern position, the leading and trailing edges of the tread material wound on the base tire meet well in pattern at the joint. Therefore, the joint is unlikely to suffer local wearing or separation, and its outer appearance exhibits a good quality.

Since the deviation amount between the position at the distance corresponding to the required tread length necessary for winding the tread material on the base tire from the leading edge of the vulcanized tread material and the predetermined pattern position near that position planned to be cut is detected, it is possible to wind the tread material on the outer circumference of the base tire while adjusting its length by applying a substantially uniform tensile or compressive force to the tread material toward removing the deviation, and it is therefore possible to automatically and efficiently adjust the tension or compression of the tread material uniformly over the entire length thereof upon winding it and to realize an adequate joint condition of the leading and trailing edges.

Yet another embodiment of the invention is the re-treading method characterized in further comprising photographing a tread pattern in a portion distant by the required tread length from the leading edge of said vulcanized tread material vulcanized and molded in the form of a continuous belt; and comparing the photographed tread pattern image with a tread pattern image stored beforehand to detect said deviation amount.

Since the deviation amount is detected by photographing the tread pattern in a zone at the position distant by the required tread length from the leading edge of the tread material and comparing it with the stored tread pattern image, the deviation amount can be detected precisely, efficiently and automatically.

A still further embodiment of the invention is a method of feeding the tread material onto the base tire under rotation and winding it in the re-treading method, characterized in further comprising calculating the peripheral speed of said base tire along the maximum outer diameter thereof during rotation of said base tire at a predetermined angular velocity; calculating a tread feeding speed which can apply a tensile or compressive force to said tread material toward removing said deviation amount from the peripheral speed of said base tire, said required tread length and said deviation amount; and winding said tread member fed at the calculated tread feeding speed.

By detecting the deviation amount beforehand, it is possible to calculate, beforehand, the tread feeding speed relative to the peripheral speed of the base tire to which a tensile or compressive force is applied toward removing the deviation amount, and it is therefore possible to automatically and efficiently adjust the tension or compression of the tread material uniformly over the entire length thereof upon winding it and to realize an adequate joint condition of the leading and trailing edges.

The method of the invention also includes feeding the tread material onto the base tire under rotation and winding it in the re-treading method characterized in further comprising feeding said tread material at a constant tread feeding speed; calculating a peripheral speed of said base tire which can apply a tensile or compressive force to said tread material toward removing said deviation amount from said tread feeding speed, length of said tread member and said deviation amount; and winding said tread material onto said base tire rotated at the calculated peripheral speed.

By detecting the deviation amount beforehand, it is possible to calculate, beforehand, the peripheral speed of the base tire relative to the constant tread feeding speed, which ensures application of a tensile or compressive force toward removing the deviation amount, and it is therefore possible to automatically and efficiently adjust the tension or compression of the tread material uniformly over the entire length thereof upon winding it and to realize an adequate joint condition of the leading and trailing edges.

The present invention further includes the re-treading method characterized in that said tread material is cut into a tread length which ensures that the ratio of said deviation amount relative to the tread length of said tread material cut out falls in the range from −4% to 2%.

If the ratio of the deviation amount relative to the tread length is out of the range from −4% to 2%, the expanding or contracting ratio of the vulcanized tread material is excessively large, and a disadvantage may occur in the tread material.

The invention is also based on the re-treading method characterized in that said tread material is cut into a tread length which ensures that the ratio of said deviation amount relative to the tread length of said tread material cut out falls in the range from −2% to 0.5%.

The ratio of the deviation relative to the tread length preferably falls in the range from −2% to 0.5% for the vulcanized tread material undergoing expansion or contraction.

According to the invention, there is provided a re-treading apparatus comprising: a transport means for transporting a vulcanized tread material vulcanized and molded in form of a continuous belt; a cutting means for cutting said tread material at a cut position; a photographing means for photographing a tread pattern of said tread material; a storage means for storing a predetermined tread pattern image beforehand; an adjusting means for adjusting the cut position by moving said tread material and said cut position relative to each other; and a control means including said storage means to control said transport means, said cutting means, said photographing means and said adjusting means, said control means controlling said transport means to transport the vulcanized tread material vulcanized and molded in form of a continuous belt by a predetermined amount from the cut position; controlling said photographing means to photograph a tread pattern in a zone of said tread material including said cut position; comparing the photographed tread pattern image with the tread pattern image stored beforehand to detect a deviation amount therebetween; controlling said adjusting means to relatively move said vulcanized tread material and said cut position by said deviation amount; and controlling said cutting means to cut said tread material at the cut position after the relative movement, thereby to obtain a tread material to be wound on a base tire.

By transporting a predetermined length of the tread member from its cut position with the transport means, the cut position of the trailing edge of the tread member is roughly determined at a position near the required length necessary for winding it on the base tire is roughly determined, and the tread pattern in a zone including the cut position is photographed by the photographing means. Thus, by comparing it with the stored tread pattern, and if it coincides, the tread material is cut at that cut position, thereby to cut it at the predetermined position on the pattern. If the comparison results in finding a deviation from the stored tread pattern image, the deviation amount is detected, and the tread material or the cut position is relatively moved by the deviation amount by the adjusting means. Thus the tread material can be cut at the predetermined position on the pattern by the cutting means.

Therefore, it is ensured that the tread material is always cut at the predetermined position of the pattern near the required length and that the leading and trailing edges of the tread material wound on the base tire meet well in pattern at the joint.

In this manner, cutting of the tread material for pattern matching can be executed automatically, efficiently and precisely.

Since the pattern matching is ensured, the joint is unlikely to suffer local wearing or separation, and its outer appearing is good as well.

According to the invention, there is also provided a re-treading apparatus comprising: a transport means for transporting a vulcanized tread material vulcanized and molded in form of a continuous belt; a cutting means for cutting said tread material at a cut position; a photographing means for photographing a tread pattern of said tread material; a storage means for storing a predetermined tread pattern image beforehand; an adjusting means for adjusting the cut position by moving said tread material and said cut position relative to each other; and a control means including said storage means to control said transport means, said cutting means, said photographing means and said adjusting means, said control means controlling said transport means to transport the vulcanized tread material vulcanized and molded in form of a continuous belt by a predetermined amount from the cut position; controlling said photographing means to photograph a tread pattern in a zone of said tread material including said cut position; comparing the photographed tread pattern image with the tread pattern image stored beforehand to detect a deviation amount there between; judging whether the deviation amount falls within an allowable range or not; controlling said adjusting means when judging said deviation amount is not in the allowable range to relatively move said tread material or said cut position by said deviation amount; not moving said tread material or said cut position when judging said deviation amount is in the allowable range; and controlling said cutting means to cut said tread material at the cut position relatively moved or not moved, thereby to obtain a tread material to be wound on a base tire.

By transporting a predetermined length of the vulcanized tread material from its cut position, the cut position of the trailing edge of the tread material near the required length necessary for winding it on the base tire is roughly determined, and the tread pattern in a zone including the cut position is photographed by the photographing means. Thus, by comparing it with the stored tread pattern, and if a deviation amount is in the allowable range, the tread material is cut at that cut position, thereby to cut it at the predetermined position on the pattern. If the comparison results in finding a deviation from the stored tread pattern image beyond the allowable range, the tread material or the cut position is relatively moved by the deviation amount. Thus the tread material can be cut at the predetermined position on the pattern by the cutting means.

Therefore, it is ensured that the tread material is always cut at the predetermined position of the pattern near the required length and that the leading and trailing edges of the tread material wound on the base tire meet well in pattern at the joint.

In this manner, cutting of the tread material for pattern matching can be executed automatically, efficiently and precisely. Since the pattern matching is ensured, the joint is unlikely to suffer local wearing or separation, and its outer appearing is good as well.

According to the invention, there is additionally provided a re-treading apparatus comprising: a deviation amount detecting means for detecting a deviation amount between a position at a required tread length from the leading edge of a vulcanized tread material vulcanized and molded in form of a continuous belt and a predetermined pattern position near said position planned to be cut; a cutting means for cutting said vulcanized tread material; a base tire support means rotatably supporting a base tire; a tread material feeding means for feeding the vulcanized tread material cut at said predetermined pattern position by said cutting means onto said base tire; and a control means for controlling the peripheral speed of said base tire or the tread feeding speed by said tread material feeding means to wind said tread material on the outer circumference of said base tire while adjusting the length of said tread material by applying a substantially uniform tensile or compressive force to said tread material cut out toward removing said deviation amount.

Since the tread material is always cut at the predetermined pattern position, the leading and trailing edges of the tread material wound on the base tire meet well in pattern at the joint. Therefore, the joint is unlikely to suffer local wearing Or separation, and its outer appearance exhibits a good quality as well.

Additionally, since it detects the deviation mount between the position distant by the required tread length necessary for winding the tread material on the base tire from the leading edge of the vulcanized tread material and the predetermined pattern position near that position planned to be out, it is possible to wind the tread material on the outer circumference of the base tire while adjusting its length by applying a substantially uniform tensile or compressive force to the tread material by controlling the peripheral speed of the base tire or the tread feeding speed toward removing the deviation, and it is therefore possible to automatically and efficiently adjust the tension or compression of the tread material uniformly over the entire length thereof upon winding it and to realize an adequate joint condition of the leading and trailing edges.

The invention is also based on the re-treading apparatus characterized in that said deviation amount detecting means includes a photographing means for photographing a tread pattern in a zone at a required tread length from the leading edge of said vulcanized tread material vulcanized and molded in form of a continuous belt, and detects said deviation amount by comparing the tread pattern image photographed by said photographing means with a tread pattern image stored beforehand.

Since it detects the deviation amount by photographing the tread pattern in a zone at the required tread length from the leading edge of the tread material by using the photographing means and comparing it with the stored tread pattern image, the deviation can be detected precisely, efficiently and automatically.

Furthermore, the invention is based on the re-treading apparatus characterized in that said control means correlatively controls the peripheral speed of said base tire and said tread feeding speed from the length of said tread material and said deviation amount toward removing said deviation amount from said tread material, and winds said vulcanized tread material onto the outer circumference of said tire while applying a substantially uniform tensile or compressive force to said vulcanized tread material.

By detecting the deviation amount beforehand, it is possible to calculate, beforehand, the peripheral speed of the base tire the tread feeding speed are correlatively controlled to ensure application of a tensile or compressive force toward removing the deviation amount, and it is therefore possible to automatically and efficiently adjust the tension or compression of the tread material uniformly over the entire length thereof upon winding it and to realize an adequate joint condition of the leading and trailing edges.

DESCRIPTION OF THE PREFERRED EMBODIMENTS

A preferred embodiment of the present invention will now be described with reference to FIGS. 1 to 9. A method and an apparatus according to the invention for cutting a vulcanized tread material are applied to a procure recapping system for recaps.

The precure recapping is a recapping method in which after a used tire has its tread shaved off to recreate a base tire, tread vulcanized and molded with pattern grooved therein is attached to the base tire and then vulcanized in a vulcanization chamber to recap the used tire. Procedural steps of creating a recap by means of the precure recapping are outlined in FIG. 1.

Figure 1:
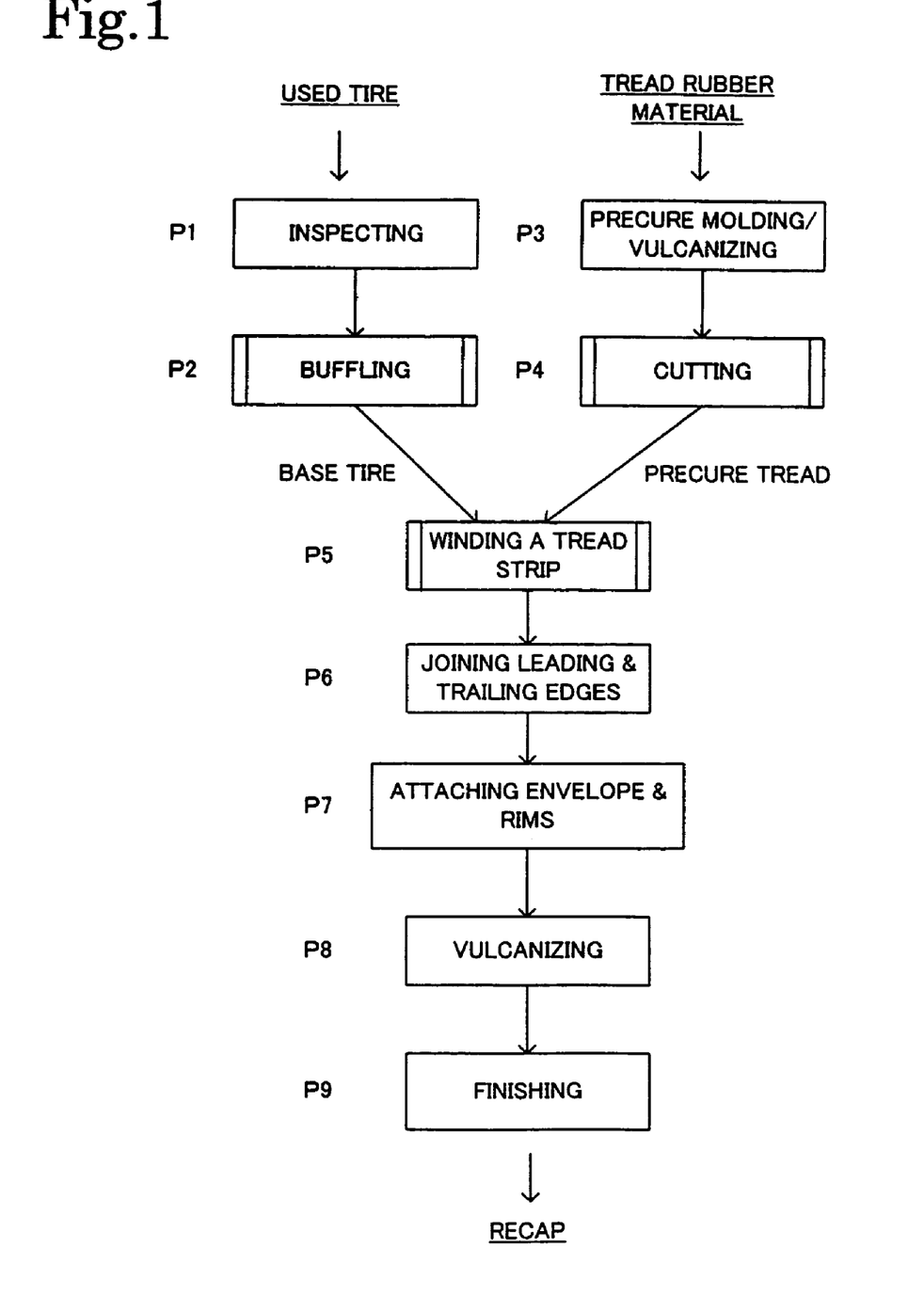
FIG. 1 is a schematic diagram showing procedural steps of manufacturing recaps in a precure recapping method.

In an inspection process P1, used tire has its surface, holes made by nails, and gashes examined to determine if it is recappable by means of the retreading, and if not, that tire is excluded.

The recappable tire subsequently undergoes buffing in the next process P2, and it has an outer circumferential surface of the tread shaved off to be finish as a base tire.

The base tire is fixed by partial polishing and/or void filling between buffing and winding procedures.

In a process P3 carried out in parallel, tread rubber material is subjected to the procure vulcanizing and molding to create pattern-embossed tread, The precure tread vulcanized and molded with pattern embossed thereon is shaped in continent belt, and it is cut into strips of a desired length during a cutting procedure in the next process P4.

In a winding process P5, the precure tread is wound around the base tire.

In advance of the winding of the precure tread, after coating the outer circumferential surface of the base tire with cement, cushion sheet is affixed, or alternatively, cushioning maybe applied directly to the base tire by a push bench.

The tire at this point is rotatable supported, and the precure tread is sent from a feeder and wound around the outer circumferential surface of the tire.

In a succeeding process P6, leading and trailing edges of the precure tread wound on the base tire are joined via cushion rubber and united together by a stapler.

The base tire muffled by the precure tread is enclosed in a suck-shaped sheet or an envelope, and beads are attached to rims (process P7) so as to air-tightly seal the envelope.

After being wound by the precure tread and enclosed in the envelope, several such base tires are put together in the vulcanization chamber and vulcanized (process P8).

After the vulcanization, the rims and envelop are removed to finish the tires as recaps (process P9).

The present invention relates to the cutting process P4 among the aforementioned procedures.

Figure 2:
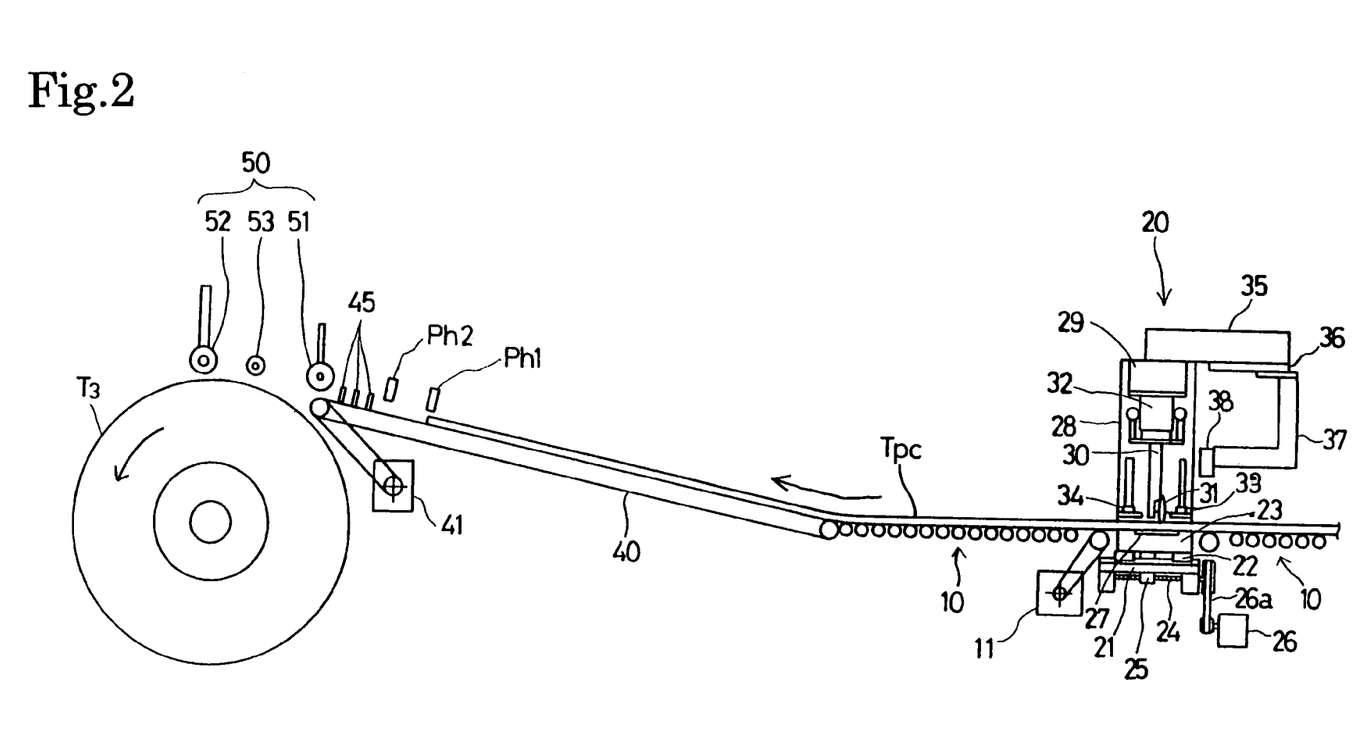
FIG. 2 is a side elevational view of the entirety including cutter and a bonding machine.

FIG. 2 shows a cutter 20 and a tread bonding machine 50 for executing the cutting process.

The cutter 20 is disposed in a middle point of a roller conveyor 10 driven by a servo motor 11, and has a slide mount 23 slidably supported on a stationary chassis 21 via an LM guide 22, a nut member 25 which is in engagement with a ball screw 24 rotatably supported by the chassis 21 to extend in the front and back directions and integrally attached to the slide support 23, and the ball screw 24 rotated by the servo motor 26 via a timing belt 26*a*.

When the ball screw 24 rotates with a driving force from the servo motor 26, the nut member 25 in engagement with the ball screw 24 can slide in the front and back directions integrally with the slide support 23.

An anvil 27 spans on the top surface of the slide support 23, and a cross member 29 is supported to bridge posts 28, 28 that stand at right and left ends.

A support rod 30 hangs down from the bottom surface of the cross member 29 for sliding movements in the right and left directions, and a rotary cutter 31 is provided at its lower end to be rotated by a motor.

A support rod 30 can slide in the right and left direction with a force from an air cylinder 32.

Therefore, when the air cylinder 32 drives the rotary cutter 31 rotated by the motor in the right and left directions, the precure tread Tpc on the anvil 27 can be cut.

At the front and back positions of the moving stroke of the rotary cutter 31, material weights 33, 34 are provided.

An L-shaped arm 37 is suspended from a horizontal support member 35 backwardly projecting from the center of the cross member 29, in terms of the right and left directions, to be moved by an air cylinder 36 in the front and back directions, and a camera 38 for image processing is attached to the distal end of the arm 37.

Since the arm 37 moves in the front and back directions with a driving force from the air cylinder, the camera 38 at the distal end of the arm moves forward from its withdrawal position shown in FIG. 2 and can advance to a predetermined position above a central position where the rotary cutter 31 moves, where the camera 38 can take a picture of the pattern in a zone including the cut position on the precure tread Tpc located below.

The main body of the cutting machine, including the rotary cutter 31, camera 38, material weights 33, 34, their driving mechanisms, and others, is entirely held on the slide support 23 and can be moved entirely by the servo motor 26 to change the position to be cut by the rotary cutter 31 in the front and back directions.

In front of the roller conveyor 10, an elongated belt conveyor 40 is provided to extend diagonally upward toward a base tire $T_3$ rotatably supported, and the bet conveyor 40 rotates with a force from a servo motor 41.

Photoelectric switches Ph1 and Ph2 are located sequentially in the feeding direction at predetermined positions downstream and above the belt conveyor 40.

The photoelectric switch Ph1 is located at a predetermined distance D1 from the cut position by the rotary cutter 31, and the photoelectric switch Ph2 is located at a predetermined distance D2 from the photoelectric switch Ph1 in the downstream direction such that the photoelectric switches Ph1 and Ph2 can successively detect the leading edge of the precure tread Tpc transported by the belt conveyor 40.

At a more downstream position near one end of the belt conveyor 40, a plurality of centering rollers are aligned in the right end lift sides to guide opposite sides of the transported precure tread Tpc and thereby feed it while positioning it in the center.

The leading edge of the belt conveyor 40 is located in close relation with and diagonally above the base tire $T_3$ rotated by the servo motor (not shown), and the tread bonding machine 50 lie on the leading edge of the belt conveyor 40 to above the base tire $T_3$.

The tread bonding machine 50 includes a first roller 51 located above the leading edge of the belt conveyor 40 to urge the precure tread Tpc against the roller 42 at the leading end of the belt conveyor 40 and feed it while preventing it from slippage, a second roller 52 located above the base tire $T_3$ to urge the precure tread Tpc against the base tire $T_3$ and bond it while preventing it from slippage, and a third roller 53 located between the first roller 51 and the second roller 52 to prevent the precure tread Tpc from deformation.

All of the first, second and third rollers 51, 52, 53 are free rollers.

Upon bonding, the tread bonding machine 50 controls the difference between the feeding speed of the belt conveyor 40 and the peripheral speed of the base tire $T_3$ while winding the precure tread Tpc sent from the belt conveyor 40 onto the base tire $T_3$, thereby to apply a tensile force or a contractive force to adjust the length. In this process, the first, second and third rollers 51, 52, 53 help the tread bonding machine 50 to smoothly perform the bonding task.

The cutting process (process P4) and the winding process (process P5) are executed by the cutting machine 20 and the tread bonding machine 50 explained above.

Figure 3:
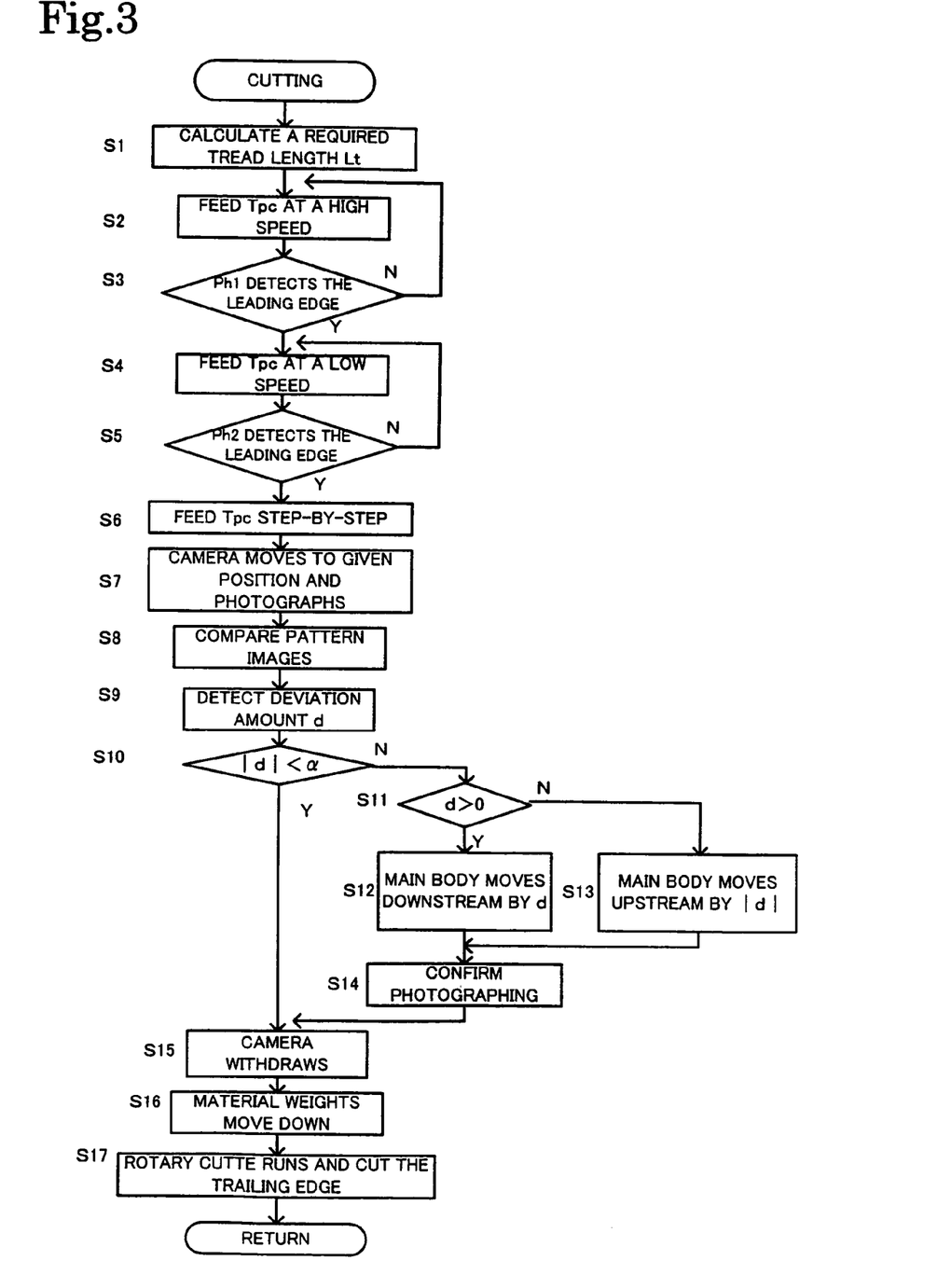
FIG. 3 is a flowchart that shows control procedures in the cutting process.
Figure 4:
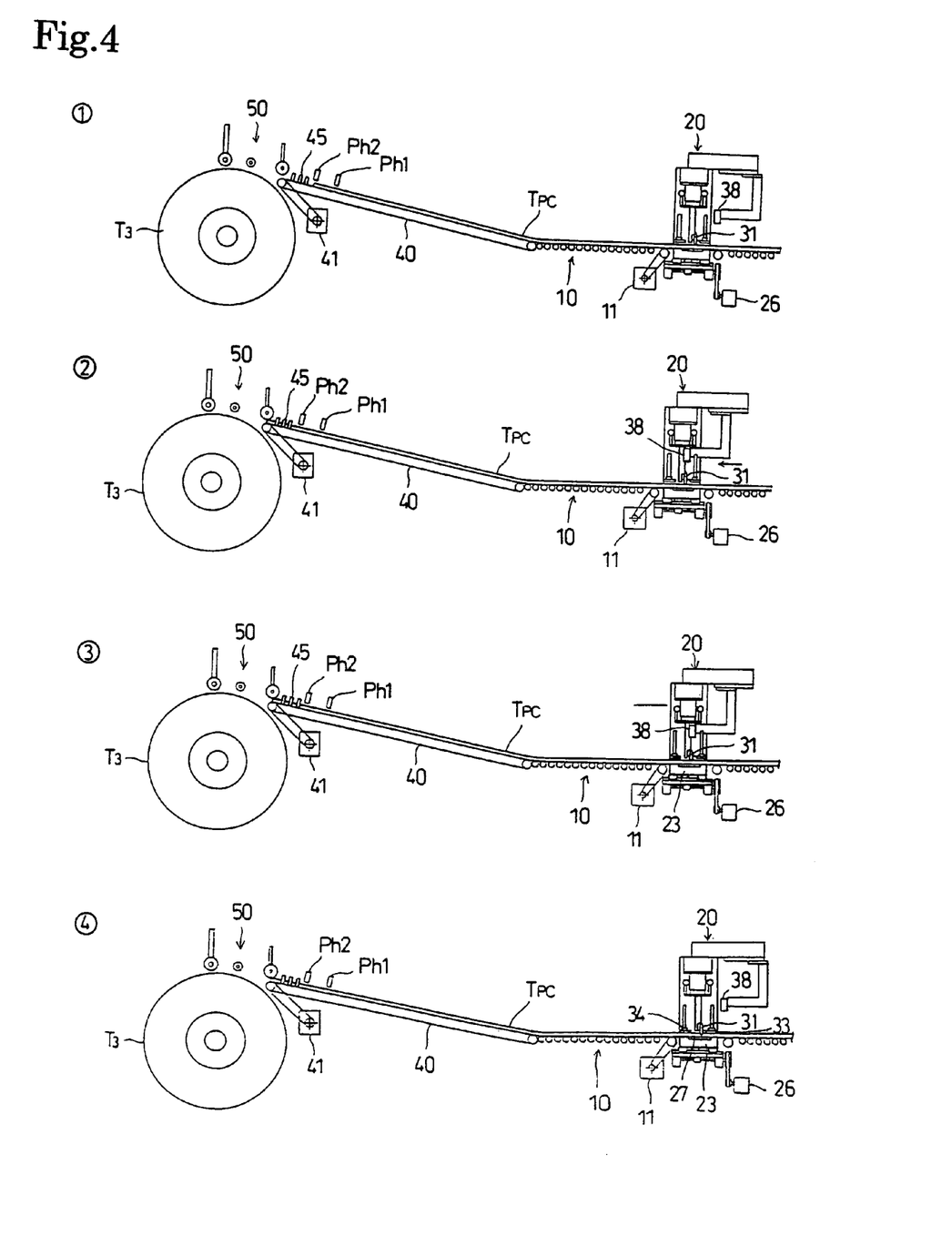
FIG. 4 is a diagram that shows aspects under different cutting steps.

As to the cutting process, control procedures are shown in the flowchart of FIG. 3, and respective aspects of the precure tread Tpc and the cutting machine 20 are shown in FIG. 4.

The cutting process is now explained along with the flowchart, occasionally referring to FIG. 4.

In step S1, a required length Lt of tread necessary for winding it on the base tire $T_3$ is calculated by multiplying the outer circumferential length Lc of the base tire $T_3$ by a correction coefficient γ.

Since the outer circumferential length Lc of the base tire $T_3$ is targeted when buffing the tire to be recapped, the same target value may be used. By using classifying base tires and using a uniform circumferential length Lc for each class, it is possible to manage various kinds of tires with a small number of control values, simplify the control while maintaining a high accuracy and thereby improve the efficiency of the cutting process.

It is also possible to newly measure the outer circumferential length Lc by, for example, rolling the roller on outer circumferential surface of the base tire $T_3$ and detecting the number of rotations of the roller with a rotation sensor.

When the outer circumferential length Lc of the base tire $T_3$ thus determined is multiplied by the correction coefficient γ found by calculation, the required length of tread Lt (=Lc·γ) of the precure tread Tpc, which can be just wound on the outer circumferential surface of the base tire $T_3$ can be obtained.

The correction coefficient γ is the value taking cushion rubber interposed on the peripheral surface of the base tire $T_3$ into consideration.

The belt-like elongated pattern-embossed precure tread Tpc vulcanized and molded in the PC molding process P3 already explained is transported by the roller conveyor 10, passing through the cutting machine 20, and the leading portion of the precure tread Tpc re-rides on the belt conveyor 40 and is transported at the same speed. At first, however, the precure tread Tpc is fed at a high speed (step S2).

The photoelectric switch Ph1 is located at a distance (predetermined distance D1 (for example, 2850 mm)) corresponding to approximately 95% of the required length of tread Lt (for example, 3000 mm) from the cut position by the rotary cutter 31 of the cutting machine 20, and when the leading edge of the precure tread Tpc sent at a high speed is detected by the photoelectric switch Ph1 (step S3), the speed is changed to a low speed (stop S4).

FIG. 2 shows the configuration at the time when the leading edge of the precure tread Tpc under a high speed is detected by the photoelectric switch Ph1 and the speed is changed to a low speed.

When the photoelectric switch Ph2 located downstream the photoelectric switch Ph1 by the distance D2 (for example, 100 mm) detects the leading edge of the precure tread Tpc (step S5), the servo motors 41, 11 are changed to step-feeding modes for transporting the tread by counting pulses (step S6).

FIG. 4 (1) shows the configuration at the time when the leading edge of the precure tread Tpc under a low speed is detected by the photoelectric switch Ph2 and the feeding mode is changed to a step feeding mode.

The step feeding mode ensures that a predetermined length of the precure tread Tpc is accurately fed for the trailing edge to be cut.

Assuming that the required length of tread Lt is 3000 mm, D1=2850, and D2=100 mm, the high speed feeding mode is employed to shorten the work time until the tread runs the distance 2850 mm corresponding to a large part of its length from the cut position of the cutting machine 20, whereas the low speed feeding mode is employed for the next distance 100 mm such that the photoelectric switch Ph2 can accurately detect the leading edge of the precure tread Tpc.

When the precure tread Tpc runs the distance 2950 mm from the cut position of the cutting machine 20, the remainder 50 mm is converted to the number of pulses of the servo motors 41, 11, and the servo motors 41, 11 are driven in the pulse driving mode to precisely feed the 50 mm length of the tread step by step while counting the pulses.

In general, the length for step-by-step feeding is calculated from L5−(D1+D2).

In this manner, by stopping the precure tread Tpc at the point where the required length thereof. Lt is accurately runs from the cutting position of the cutting machine 20 and cutting the trailing edge of the precure tread Tpc at that cutting position with the rotary cutter 31, the precure tread Tpc having the required tread length Lt can be cut out precisely.

However, in case the trailing edge of the precure tread Tpc is cut in the aforementioned manner, it is not ensured that tread patterns are cut at a predetermined position, and therefore, it cannot be expected that patterns match when the leading and trailing edges are joined.

Taking it into consideration, at the point where the precure tread Tpc is transported in the step feeding mode by the required tread length Lt in step S6, the image processing camera 38 provided in the cutting machine 20 is brought ahead to the predetermined position, and the zone including the cutting position on the surface of the precure tread Tpc is photographed (step S7).

FIG. 4 (2) shows the configuration at that point of time.

Figure 5:
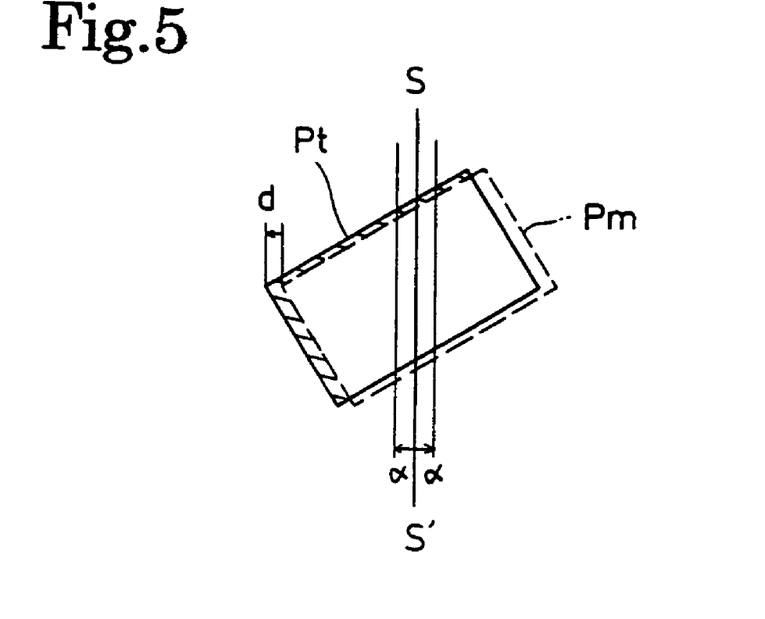
FIG. 5 is a diagram that shows a simplified tread pattern image.
Figure 6:
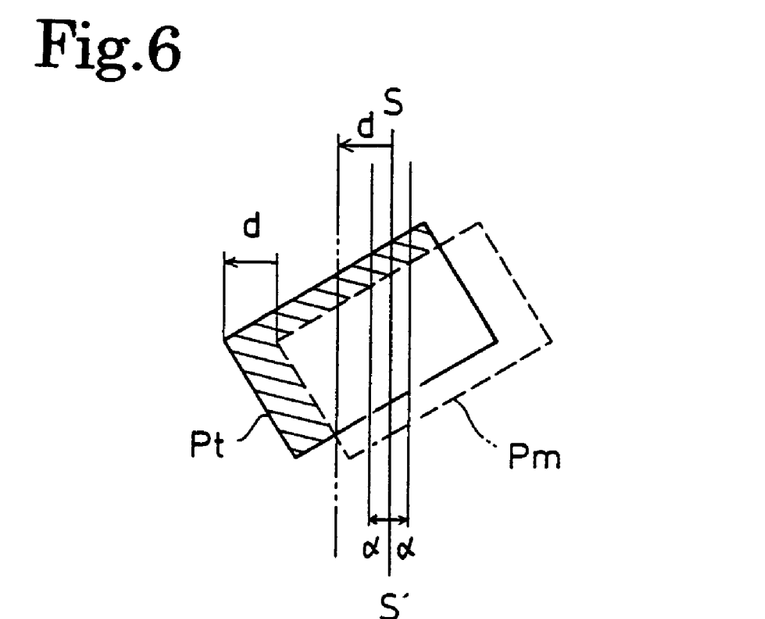
FIG. 6 is a diagram that shows another simplified tread pattern image.

FIGS. 5 and 6 show tread pattern images Pt simplified into solid-line rectangles.

On the other hand, an image processing control device stores a tread pattern image near the cut position, and a planned cut line S–S' is preset in the stored tread pattern image Pm.

FIGS. 5 and 6 each show the tread pattern image Pm and the planned cut line S–S' overlapping on a screen of the photographed tread pattern image Pt.

The rectangular block shown by the broken line is the stored tread pattern image Pm, and the planned cut line S–S' is preset at a predetermined position of the tread pattern image Pm.

The planned cut line S–S' simultaneously shown on the tread pattern image Pt taken by the camera 38 corresponds to the cut line C–C' at the corresponding position of the actual precure tread Tpc, and the cutting machine 20 is configured to actually cut the precure tread Tpc with the rotary cutter 31 running along the cut line C–C'.

That is, the planned cut line S–S' corresponding to the photographed tread pattern image Pt in FIG. 5 and FIG. 6 results in showing the position of the corresponding tread pattern to be actually cut.

The planned cut line S–S' is determined to ensure that all divisional pattern blocks divided by cutting respective blocks of the tread pattern images have volumes not smaller than a predetermined value.

Therefore, when a tread material is cut at a corresponding actual cut position, none of divisional pattern blocks has an unacceptably small volume, and disadvantages including local wearing or separation along the joint after joining the leading and trailing edges can be prevented.

After the tread pattern in the zone including the cut position of the precure tread Tpc is photographed in step S7, the photographed tread pattern image Pt and the stored tread pattern image Pm are stacked ad shown in FIGS. 5 and 6 to compare them (step S8).

If there is any difference between them, by computing the area of a part of the photographed tread pattern image Pt out of the stored tread patter image Pm (the hatched portion in FIG. 5 of FIG. 6), the deviation amount d can be detected (step S9).

The deviation amount d is a positive value when the photographed tread pattern image Pt is offset in the upstream side of the stored tread pattern image Pm, and it is a negative value when the deviation is in the opposite downstream side.

It is next judged whether the deviation amount d is within a predetermined allowable range ($-\alpha$–$+\alpha$) or not (step S10), and if it is in the allowable range as shown in FIG. 5 the flow directly jumps to the step S15 to withdraw the camera 38. If the deviation amount d is out of the allowable range, the flow goes to the step S11 to judge whether the deviation amount d is positive or negative.

If the deviation amount d is a positive value out of the allowable range (d>$\alpha$), then the flow goes to the step S12, where the servomotor 26 is activated to move the main body of the cutting machine 20 to the downstream side by the deviation amount d to again take a tread pattern image with the camera 38 in step 514, then compare both tread pattern images and confirm that the new deviation amount is in the allowable range.

FIG. 4 (3) shows the configuration where the main body of the cutting machine has been moved forward by the deviation amount d.

At that time, the planned cut line S–S' moves relatively to the photographed tread pattern image Pt to lie at the position shown by the two-dot chain line as shown in FIG. 6.

If the deviation amount is a negative value out of the allowable range (d<$-\alpha$), then the flow goes from the step S11 to the step 13, and after moving the main body of the cutting machine 20 to the upstream side by the deviation *d*, the flow goes to the step S14.

Although the foregoing embodiment is configured to move the main body of the cutting machine 20, it is also possible to hold it stationary and instead move the precure tread Tpc by the deviation amount –d. In this case, the movement direction is opposite from that explained above.

In step S15 after confirmation in step S14, the camera 38 withdraws from the predetermined position, the material weights 33, 34 move down (step S16), and press and fix front and back positions of the cut position of the precure tread Tpc. After that, in step S17, the rotary cutter 31 runs and cuts the trailing edge of the precure tread Tpc.

FIG. 4 (4) shows the configuration immediately after the cutting.

Since the trailing edge of the precure tread Tpc is cut in the above-explained process, the cut position of the precure tread Tpc always reliably comes to the predetermined position on the tread pattern near the required length of tread Lt.

Figure 9:
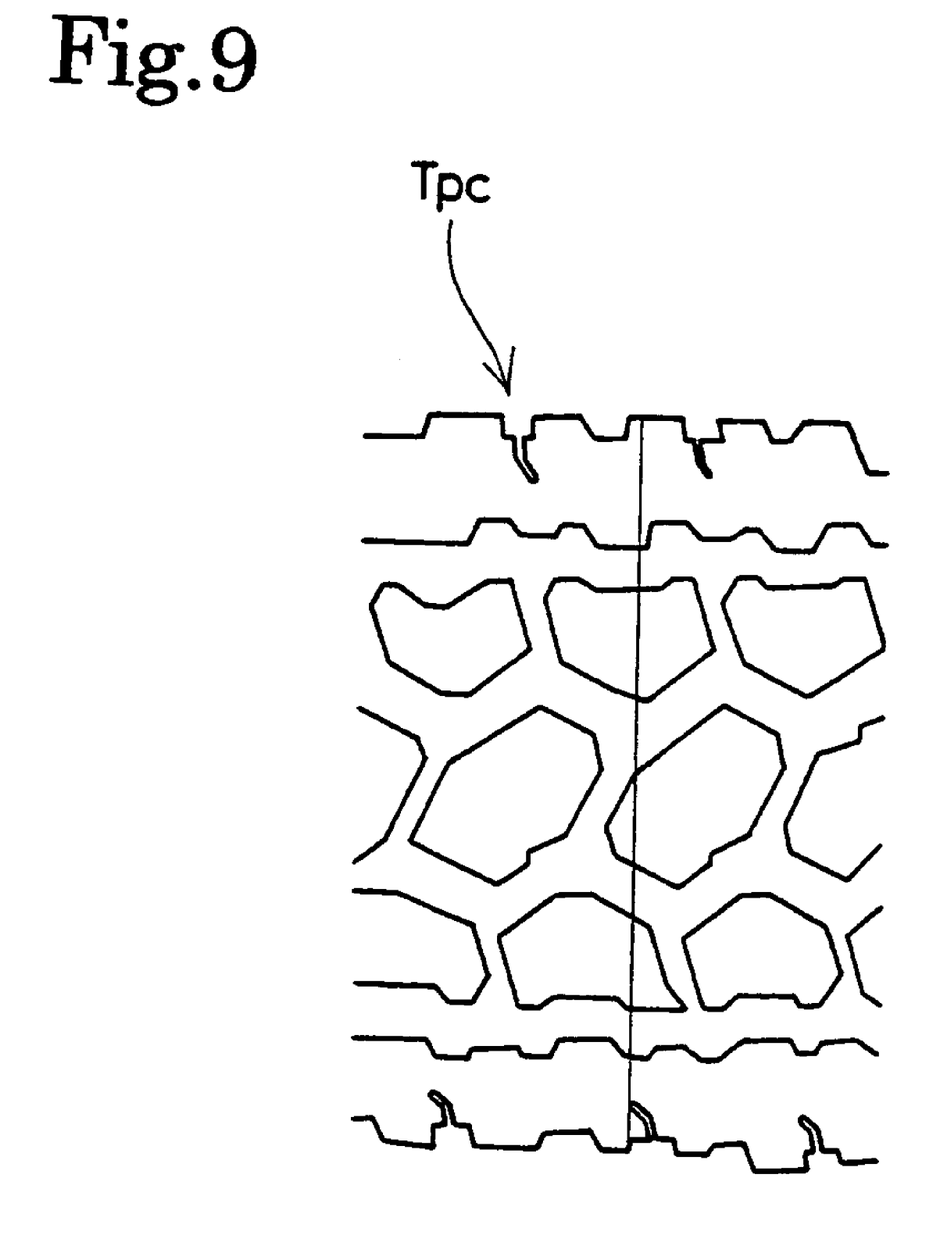
FIG. 9 is a diagram that shows a pattern-matched joint condition of the leading and trailing edges of the pre-cure tread.

Therefore, when the cut-out precure tread Tpc is wound on the base tire $T_3$ and its leading and trailing edges are joined, these leading and trailing edges always reliably cut at predetermined positions on a pattern match in pattern at the joint as shown in FIG. 9. Therefore, local wearing or separation along the joint are unlikely to occur, and the outer aspect is also good.

However, although the actual cut-out length of the precure tread Tpc is near the required length of tread Lt, it is still different from the required tread length Lt by the movement distance (deviation amount d) of the main body of the cutting machine 20.

Taking it into consideration, when the precure tread Tpc is wound on the base tire $T_3$, a tensile or compressive force is applied thereto to adjust its length.

That is, the actual length of the precure tread Tpc is Lt–d whereas the difference from the required tread length Lt is d, and the ratio (expanding or contracting ratio) $\delta$ of the difference d relative to the actual tread length Lt–d is d/(Lt–d).

When the expanding or contracting ratio $\delta$ is a positive value, it indicates the value of tension, and if it is a negative value, it indicates the value of contraction.

If the expanding or contracting ratio $\delta$ is excessively large, a defect will occur in the precure tread Tpc itself. Therefore, the precure tread has to be cut to have a tread length Lt–d in the range from –4% to 2% (from 4% of tension to 2% of contraction), and preferably in the range from –2% to 0.5%.

Taking it into consideration, there is a method of correcting the deviation amount d to minimize the movement of the main body of the cutting machine 20 in steps S12 and S13 within the allowable range ($-\alpha$–$\alpha$).

For the purpose of adjusting the length by applying a tensile or compressive force when the precure tread Tpc is wound on the base tire $T_3$, a difference is made between the tread feeding speed V1 of the precure tread Tpc by the belt conveyor 40 and the peripheral speed V2 of the maximum outer diameter of the base tire $T_3$.

Figure 7:
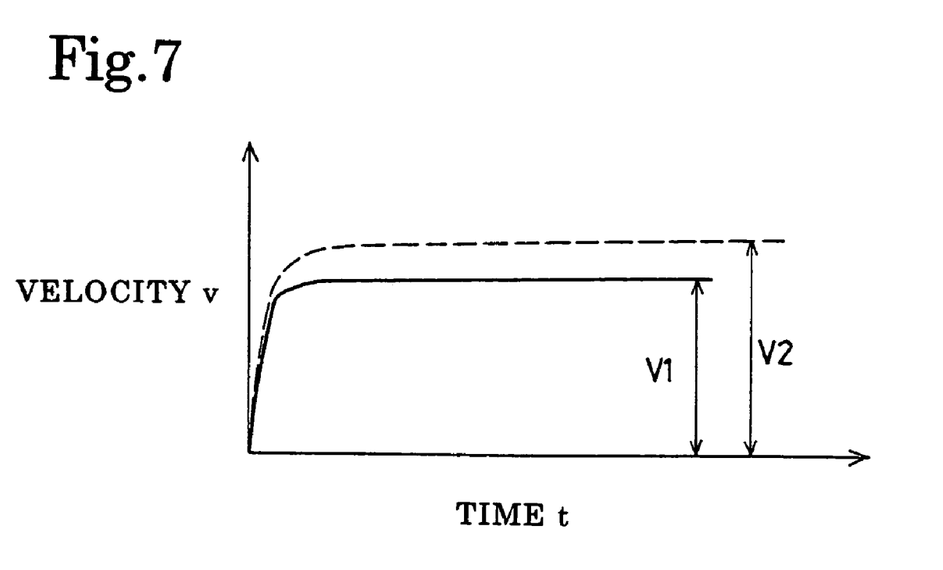
FIG. 7 is a diagram that shows changes of the tread feeding speed and the peripheral speed of the base tire upon application of a tension to the pre-cure tread.

In case of changing the tread feeding speed V1 while fixing the peripheral speed V2 of the base tire $T_3$, the tread feeding speed V1 is reset to a value calclated from V1=V2=(1–$\delta$), and changes in speed upon application of a tension of $\delta$>0 is shown in FIG. 7.

In FIG. 7, the broken line shows the peripheral speed V2 of the base tire $T_3$, and the solid line of lower speeds is the tread feeding speed V1.

Figure 8:
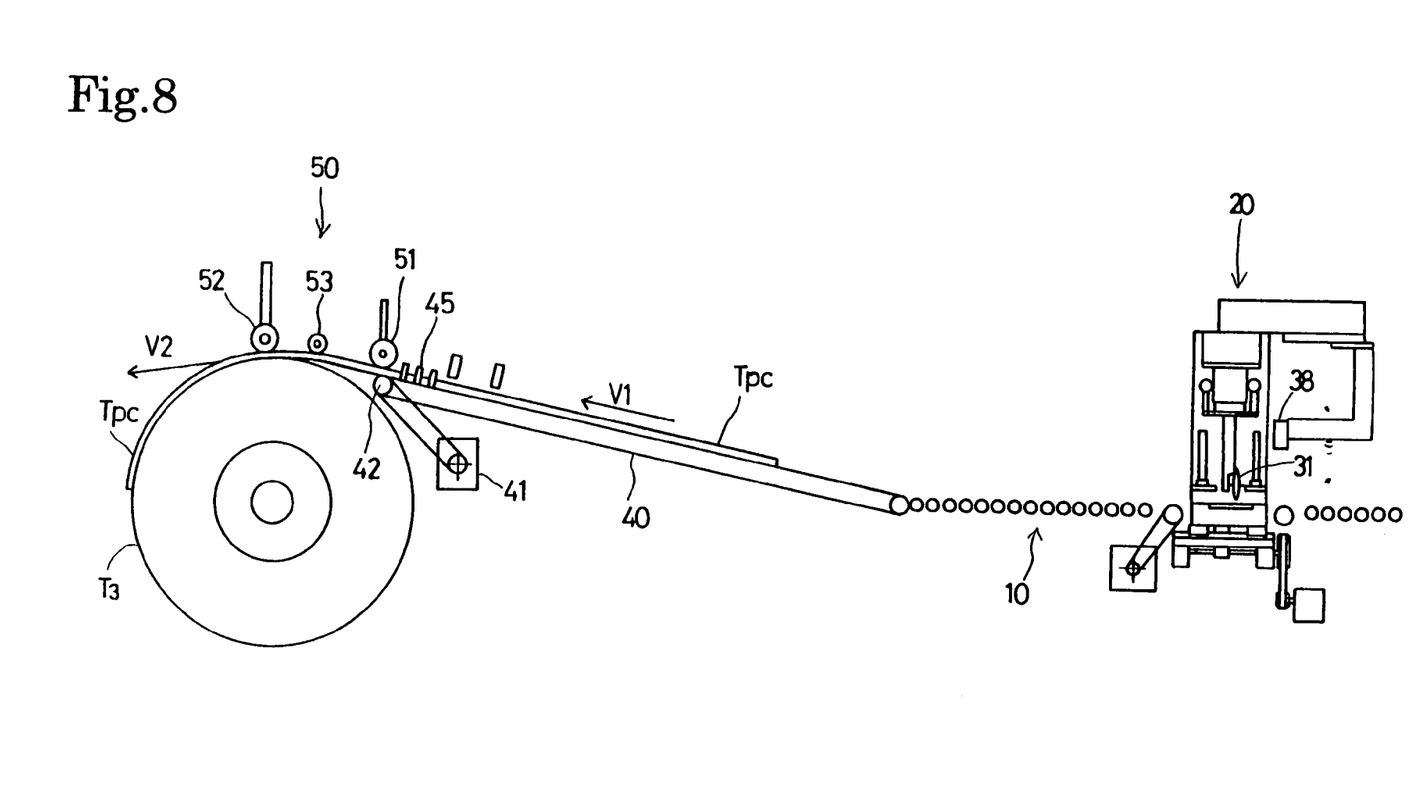
FIG. 8 is a side elevational view of the entirety including the cutter and the bonding machine during winding of the pre-cure tread onto a base tire.

Referring to FIG. 8, since the leading portion of the precure tread Tpc sticking onto the base tire $T_3$ is wound at the peripheral speed V2 whereas the trailing portion sent at the tread feeding speed V1 is fed at a lower speed, the precure tread Tpc is wound on the base tire $T_3$ while being expanded under a tensile force.

The precure tread Tpc cut to the tread length Lt–d is transported at the tread feeding speed V1 by the belt conveyor 40, and after guided and centered from opposite sides by the centering rollers 45 neat the leading edge, it is sent out onto the base tire $T_3$ while sandwiched together with the conveyor belt between the roller 42 and the first roller 51 for the purpose of preventing slippage.

The precure tread Tpc sent out sticks from its leading edge on the peripheral surface of the base tire $T_3$ rotating at the peripheral speed of V2, and it is progressively wound while pressed against the base tire $T_3$ by the second roller 52 for preventing slippage.

When the tread feeding speed V1 is lower than the peripheral speed V2 of the base tire $T_3$, a tensile force is applied to the precure tread Tpc between the first roller 51 and the second roller 52 to expand the precure tread Tpc while the base tire $T_3$ is wound.

If the tread feeding speed V1 is higher than the peripheral speed V2 of the base tire $T_3$, a compressive force is applied to the precure tread Tpc between the first roller 51 and the second roller 52, and the precure tread Tpc is compressed while it is wound the base tire $T_3$.

When a compressive force is applied to the precure tread Tpc, the precure tread Tpc is prevented from deforming between the first roller and the second roller 52 under a pressure from the third roller 53.

Since the precure tread Tpc is progressively wound on the base tire $T_3$ while a tensile or compressive force is applied to the precure tread Tpc by adjusting the tread feeding speed V1 in the above-explained manner, the precure tread Tpc is precure tread Tpc adjusted to the required tread length Lt by the tensile or compressive force during one revolution of the base tire $T_3$ to ensure that the leading and trailing edges meet substantially precisely.

Then the leading and trailing edges of the precure tread Tpc wound on the base tire $T_3$ are joined together by a stapler, or the like, via cushioning rubber interposed therebetween.

FIG. 9 shows the joint of the leading and trailing edges of the precure tread Tpc with a straight line. As shown in FIG. 9, both edges match in tread pattern at the joint, and therefore, the joint is unlikely to suffer local wearing or separation, and its outer appearance is good as well.

To apply a tensile or compressive force to the precure tread Tpc, the foregoing embodiment changes the tread feeding speed V1 while fixing the peripheral speed V2 of the base tire $T_3$. However, it is also possible, in contrast, to fix the tread feeding speed V1 while changing the peripheral speed V2 of the base tire $T_3$.

In this case, the peripheral speed V2 of the tire $T_3$ is calculated from $V2=V1/(1-\delta)$.

As described above, by comparing the tread pattern image taken by the camera 38 with the stored tread pattern image and thereby detecting the deviation amount d beforehand, it is possible to actually cut the tread material automatically, efficiently and precisely such that the leading and trailing edges of the precure tread Tpc wound on the base tire $T_3$ match in pattern with each other, and to wind the tread material properly while automatically expanding it. Therefore, recaps having an excellent lifetime can be manufactured with high accuracy and efficiency.

What is claimed is:

1. A re-treading apparatus comprising:
   a deviation amount detecting means for detecting a deviation amount between a position at a required tread length from the leading edge of a vulcanized tread material vulcanized and molded in form of a continuous belt and a predetermined pattern position near said position planned to be cut;
   a cutting means for cutting said vulcanized tread material;
   a base tire support means rotatably supporting a base tire;
   a tread material feeding means for feeding the vulcanized tread material cut at said predetermined pattern position by said cutting means onto said base tire; and
   a control means for controlling the peripheral speed of said base tire or the tread feeding speed by said tread material feeding means to wind said tread material on the outer circumference of said base tire while adjusting the length of said tread material by applying a substantially uniform tensile or compressive force to said tread material cut out toward removing said deviation amount.

2. A re-treading apparatus according to claim 1 wherein said deviation amount detecting means includes a photographing means for photographing a tread pattern in a zone at a required tread length from the leading edge of said vulcanized tread material vulcanized and molded in form of a continuous belt, and detects said deviation amount by comparing the tread pattern image photographed by said photographing means with a tread pattern image stored beforehand.

3. A re-treading apparatus according to claim 1 wherein said control means correlatively controls the peripheral speed of said base tire and said tread feeding speed from the length of said tread material and said deviation amount toward removing said deviation amount from said tread material, and winds said vulcanized tread material onto the outer circumference of said tire while applying a substantially uniform tensile or compressive force to said vulcanized tread material.

* * * * *